US011893638B2

(12) United States Patent
Hain

(10) Patent No.: US 11,893,638 B2
(45) Date of Patent: *Feb. 6, 2024

(54) SYSTEM AND METHOD FOR CONTENT STAKE VIA BLOCKCHAIN

(71) Applicant: VERASITY LIMITED, Road Town (VG)

(72) Inventor: Robert James Mark Hain, Gibraltar (GI)

(73) Assignee: Verasity Limited S.R.L., San Jose (CR)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,424

(22) Filed: Dec. 21, 2022

(65) Prior Publication Data
US 2023/0120637 A1 Apr. 20, 2023

Related U.S. Application Data

(63) Continuation-in-part of application No. 17/328,695, filed on May 24, 2021, which is a continuation-in-part
(Continued)

(51) Int. Cl.
G06Q 30/00 (2023.01)
G06Q 40/04 (2012.01)
(Continued)

(52) U.S. Cl.
CPC .......... *G06Q 40/04* (2013.01); *H04L 9/0643* (2013.01); *H04L 9/3218* (2013.01); *G06Q 2220/00* (2013.01)

(58) Field of Classification Search
None
See application file for complete search history.

(56) References Cited

U.S. PATENT DOCUMENTS 8,417,966 B1 * 4/2013 Mooneyham ......... H04L 9/3236
713/192
9,485,265 B1 * 11/2016 Saperstein ........ G06F 16/24575
(Continued)

OTHER PUBLICATIONS

Nikolakis, William, et al. "How Blockchain Can Shape Sustainability Global Value Chains: An Evidence, Verifiability, and Enforceability Framework." Sustainability, vol. 10, 2018. (Year: 2018).*

*Primary Examiner* — Luis A Brown
(74) *Attorney, Agent, or Firm* — McCarter & English, LLP; James M. Smedley; Alex Korona

(57) ABSTRACT

A content stake offering system is disclosed. The content stake offering system includes a content stake offering module, comprising computer-executable code stored in non volatile memory, a processor, and a plurality of computing devices. The content stake offering module, the processor, and the plurality of computing devices are configured to receive a request to sell a stake of content, determine a value of the content, generate a stake offering based on the value of the content, and update the value of the content. Determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain.

22 Claims, 6 Drawing Sheets

Related U.S. Application Data of application No. 17/192,045, filed on Mar. 4, 2021, now Pat. No. 11,139,977, which is a continuation-in-part of application No. 16/023,354, filed on Jun. 29, 2018, now Pat. No. 10,956,931.

(60) Provisional application No. 62/660,167, filed on Apr. 19, 2018, provisional application No. 62/627,285, filed on Feb. 7, 2018.

(51) Int. Cl.
*H04L 9/32* (2006.01)
*H04L 9/06* (2006.01)

(56) References Cited

U.S. PATENT DOCUMENTS

| | | | | |
|---|---|---|---|---|
| 9,875,510 | B1* | 1/2018 | Kasper | G06Q 40/12 |
| 10,305,833 | B1* | 5/2019 | Dennis | H04L 9/16 |
| 2007/0250901 | A1* | 10/2007 | McIntire | G11B 27/34 |
| | | | | 348/E7.071 |
| 2008/0270164 | A1* | 10/2008 | Kidder | G06Q 30/0241 |
| | | | | 705/14.4 |
| 2012/0011567 | A1* | 1/2012 | Cronk | H04N 21/25816 |
| | | | | 726/28 |
| 2014/0033317 | A1* | 1/2014 | Barber | G06Q 30/0609 |
| | | | | 709/224 |
| 2016/0219332 | A1* | 7/2016 | Asbun | H04N 21/2668 |
| 2016/0283920 | A1* | 9/2016 | Fisher | G06Q 20/065 |
| 2016/0359633 | A1* | 12/2016 | Norton | H04L 9/30 |
| 2017/0053307 | A1* | 2/2017 | Schler | G06Q 30/0248 |
| 2017/0103468 | A1* | 4/2017 | Orsini | H04L 9/3239 |
| 2017/0134161 | A1* | 5/2017 | Goeringer | G06Q 20/065 |
| 2017/0318356 | A1* | 11/2017 | Hain | G06Q 30/0251 |
| 2018/0069947 | A1* | 3/2018 | Antipa | H04L 67/63 |
| 2018/0167200 | A1* | 6/2018 | High | A61B 5/0062 |
| 2018/0167394 | A1* | 6/2018 | High | H04L 63/10 |
| 2018/0183606 | A1* | 6/2018 | High | H04L 9/30 |
| 2018/0374097 | A1* | 12/2018 | Hanna | H04L 63/123 |
| 2019/0034975 | A1* | 1/2019 | Rizk | G06F 3/0482 |
| 2019/0108545 | A1* | 4/2019 | Green | G06Q 30/0247 |
| 2019/0205932 | A1* | 7/2019 | Ericson | G06Q 20/0658 |
| 2019/0207770 | A1* | 7/2019 | Zhou | H04L 9/3239 |
| 2019/0213633 | A1* | 7/2019 | Kokernak | G06Q 20/3829 |
| 2019/0236214 | A1* | 8/2019 | Kokernak | H04N 21/478 |
| 2019/0244241 | A1* | 8/2019 | Hain | H04L 9/3236 |
| 2019/0261063 | A1* | 8/2019 | Woodman | H04N 21/44008 |
| 2020/0145219 | A1* | 5/2020 | Sebastian | G06F 21/32 |
| 2021/0194693 | A1* | 6/2021 | Hain | H04L 9/0643 |

* cited by examiner

SYSTEM AND METHOD FOR CONTENT STAKE VIA BLOCKCHAIN

RELATED APPLICATIONS

This application claims the benefit of U.S. Nonprovisional patent application Ser. No. 17/328,695 filed May 24, 2021, U.S. Nonprovisional patent application Ser. No. 17/192,045 filed Mar. 4, 2021, U.S. Nonprovisional patent application Ser. No. 16/023,354 filed Jun. 29, 2018 (now U.S. Pat. No. 10,956,931 issued on Mar. 23, 2021), U.S. Provisional Patent Application Ser. No. 62/627,285 filed Feb. 7, 2018, and U.S. Provisional Patent Application Ser. No. 62/660,167 filed Apr. 19, 2018, which are hereby incorporated by reference in their entirety.

TECHNICAL FIELD

The present disclosure is directed to an automated system and method for providing (e.g., ensuring) integrity of views of online content. Embodiments of the present invention generate and ensure proof of views (PoV) of content by leveraging blockchain to verify the veracity of content views. Generating proof of views of content may be utilized to determine the integrity of a content provider channel value, and thereby the integrity of a content market exchange, or channel stake marketplace (CSM).

BACKGROUND

Currently, views on large platforms are suspect and often faked. Views are predominantly utilized to value and measure traffic on content provider sites, and subsequently their sponsor and ad revenues are derived from the number of views. If the views are faked, altered, or manipulated, the economics for content providers is skewed. In particular, the Google and Facebook models are dependent on view count and content providers are entirely compensated on number of views even though a large part of the views counted may have not existed.

Currently there is no effective technique for transparently verifying views. Integrity and transparency of views determines the value of a content provider's channel. Without a system for verifying the integrity of views, advertisers and content providers have the difficult task of determining the actual value of a channel. Therefore, there is a need in the art for a system and method for determining the integrity of a content provider channel value and therefore the integrity of the Content Market Exchange.

Further, a number of shortcomings exist in conventional systems regarding attribution, content, and viewing of non-fungible tokens (NFTs). For example, problems exist in existing conventional systems regarding verifiability and clear attribution of authors rights for NFT content. Also, fraud often results from an inability to verify authenticity of NFTs. Further, conventional systems often fail to adequately prevent or protect, when appropriate, NFT content from being viewed and/or copied by any party except its owner. Additionally, conventional systems typically fail to provide clear attribution for events, actions, and other non-material and/or non-digital subjects. Also, conventional systems often fail to provide availability of actual content. For example, an image link contained in an NFT using conventional systems often becomes invalid over time.

The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to a content stake offering system. The content stake offering system includes a content stake offering module, comprising computer-executable code stored in non volatile memory, a processor, and a plurality of computing devices. The content stake offering module, the processor, and the plurality of computing devices are configured to receive a request to sell a stake of content, determine a value of the content, generate a stake offering based on the value of the content, and update the value of the content. Determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain. The blockchain is publicly available and accessible via a third party computing device. The content stake offering module, the processor, and the plurality of computing devices are also configured to issue the stake of the content to a user who purchased the stake of the content based on the stake offering, utilize smart contracts on the blockchain, and record data points of the content on the blockchain. The plurality of computing devices utilize the smart contracts on the blockchain, including verifying agreed-upon contractual terms between multiple parties.

In another exemplary aspect, the present disclosure is directed to a method. The method includes providing a Non-Fungible Token smart contract module, comprising computer-executable code stored in non-volatile memory, providing a Proof of View smart contract module, comprising computer-executable code stored in non-volatile memory, providing a verifier network, transferring a data of a non-fungible token to the Non-Fungible Token smart contract module and generating an event metadata based on the data of the non-fungible token, transferring the event metadata to the Proof of View smart contract module, and generating an event hash using the verifier network and transferring the event hash from the verifier network to the Proof of View smart contract module. Generating the event hash includes generating a hashed database chunk and appending the hashed database chunk to a block on a blockchain.

In another exemplary aspect, the present disclosure is directed to a Proof of View verification system. The Proof of View verification system includes a Proof of View verification module, comprising computer-executable code stored in non-volatile memory, and a processor. The Proof of View verification module and the processor are configured to receive a request for a content view to view a piece of content, record a content view data in a database chunk, hash the database chunk into a hashed database chunk, append the hashed database chunk to a block on a blockchain of the Proof of View verification system, and compare the content view data with the block on the blockchain. The blockchain is publicly available.

In another exemplary aspect, the present disclosure is directed to a method. The method includes receiving a request to sell a stake of a channel of the channel stake marketplace, determining a value of the channel, generating a stake offering based on the value of the channel, and updating the value of the channel. Determining the value of the channel includes determining the amount of verified content views of the channel. Determining the amount of verified content views of the channel includes recording a content view data in a database chunk, hashing the database chunk into a hashed database chunk, appending the hashed database chunk to a block on a blockchain, and comparing the content view data with the block on the blockchain.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION

According to an embodiment of the present invention, exemplary systems and methods described herein work to ensure the integrity and transparency of views of online content for the purpose of determining the value of a content provider's channel. The Proof of View (PoV) methodology is used to provide a transparent system for determining the integrity of such views.

According to an embodiment of the present invention, Proof of View is utilized within the system to determine the integrity of a content provider channel value and therefore the integrity of an offered Content Market Exchange. In at least some exemplary embodiments, to ensure an accurate and transparent Proof of View, the system implements publicly auditable logs. These logs may contain, for instance, data associated with views of the content, content recommendations, anonymized information on the user who viewed the content, other relevant data points, or any combination thereof. One of ordinary skill in the art would appreciate that there are numerous data points that could be used with embodiments of the present invention, and embodiments of the present invention are contemplated for use with any appropriate data points.

In one embodiment of the present invention, a Merkle hash tree will be used to minimize the volume of data to be stored, while still maintaining a guarantee that the database has never been altered. In the hash tree, each view is hashed before being combined with other hashes until a final top hash is reached. Each Top Hash may represent all of the data stored in the specific log of data. One of ordinary skill in the art would appreciate that there are numerous methods for hashing chunks of data, and embodiments of the present invention are contemplated for use with any appropriate method for hashing and storing chunks of data.

One of ordinary skill in the art would appreciate that there are numerous hashing algorithms that could be used with embodiments of the present invention, and embodiments of the present invention are contemplated for use with any appropriate hashing algorithm.

Figure 3:
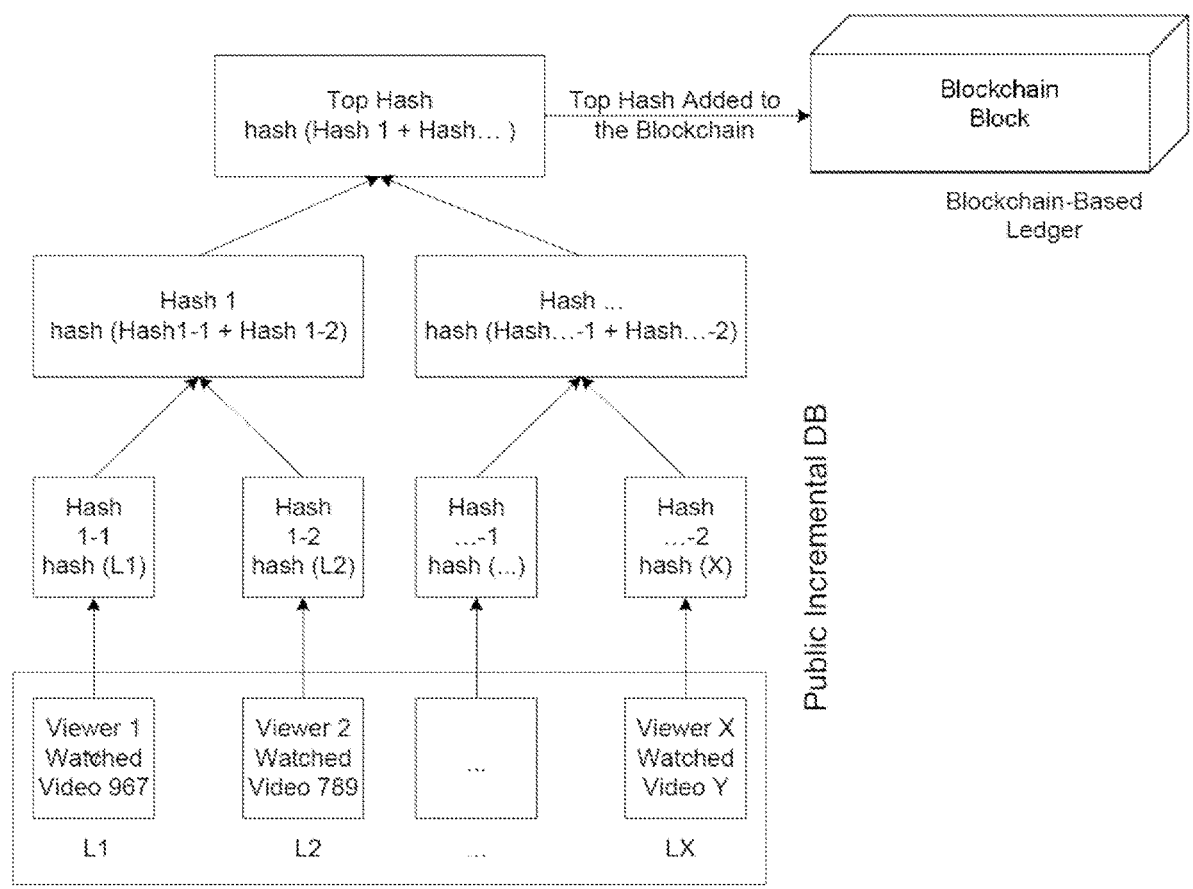
FIG. 3 is an illustration of an exemplary hashing of a chunked database utilized in conjunction with the PoV blockchain, in accordance with an embodiment of the present invention.

In an exemplary embodiment of the present invention, the system utilizes a database that is split into chunks. In this exemplary embodiment, a new chunk may be created each time a new block is created in the PoV Blockchain. A top hash of a current chunk is added to each new block in the PoV Blockchain. An exemplary embodiment is illustrated for example in FIG. 3. In alternative embodiments, the entire database may be a single file or the entire database may be stored in the blockchain. In still further embodiments, the database may be published to the PoV blockchain less often than each time a block is created. One of ordinary skill in the art would appreciate that there are numerous ways to format and record the database on the blockchain, and embodiments of the present invention are contemplated for use with any appropriate formats and recordation methods.

In at least some exemplary embodiments of the present invention, the entire database may be stored in the blockchain. Each view log entry may be stored as a separate transaction or data entry in the blockchain. The view log entry transaction may also serve as a view reward transfer transaction. The view log entry may be published to the blockchain by the viewer and/or by the system so that, for example, neither party can censor the log entry. Also for example, the entire PoV chunk may be stored in the blockchain as a single transaction or data entry. In still further embodiments, the database may be published to the PoV blockchain less often than each time a block is created. Any suitable technique may be used to format and record the database on the blockchain. The exemplary embodiments disclosed herein may be used with any appropriate formats and/or recordation methods.

In at least some exemplary embodiments of the present invention, the system may be configured to use advanced methods to ensure only views verified by the PoV methodology are counted. In accordance with these embodiments, views that are considered to be verified will be added to a publicly accessible database containing anonymized data regarding the views. In alternative embodiments, the system may be configured with open-source tools to ensure the transparency and accountability of the system. With these tools, users and third parties are able to review the data to ensure its accuracy and credibility. Although the view data may be anonymous, individual users can generate their own unique ID to verify that the views recorded for their ID are accurate and not manipulated. In accordance with these embodiments, to ensure that the data stored within the publicly accessible PoV database is reflective of the true actual data, some or substantially all view data may be sent both to the verifying system as well as to the servers hosting the content. This allows the system to automatically check that the data on the servers' view database is accurate and has not been altered. In some embodiments of the present invention, the system further comprises an application that automatically checks that the views on the blockchain are verified and matches the views on the public database. If there is any corruption or change to the data detected, an alert notice may be automatically provided by the system. In this manner, the system prevents multiple methods that users may attempt to manipulate view counts and audience metrics such as: (i) automated repeated viewing of videos (looping views); (ii) attempting to load multiple videos in parallel; (iii) loading videos in hidden windows/tabs; and (iv) attempting to manipulate analytics without actually watching the videos. Alternatively in at least some exemplary embodiments, the exemplary disclosed PoV database may be stored using computing devices for example as described herein regarding FIGS. 1 and 2. For example, the computing devices as described herein regarding FIGS. 1 and 2 may allow or block (e.g., not allow) free access to the exemplary disclosed PoV database and proof of view data.

In at least some exemplary embodiments of the present invention, the system provides an internal market exchange for stakes in content such as content channels. This system thereby enables content creators/publishers to finance additional growth and development of their content via offering stakes in their channels and future content offerings. According to an embodiment of the present invention, creators/publishers can sell a part in their channel to stakeholders at a price set by Creators/publishers. The sale may be conducted in a cryptocurrency, fractional ownership offering, or other currency or similar offering. In at least some exemplary embodiments, participation in the channel may provide the same % share of future earnings back to stakeholders in the channel based on their ownership in the channel. In certain instances, stakeholders in a channel can resell their stake through the Content Market Exchange based on the current market value of the stake. Much like in other marketplaces (e.g., securities markets), limitations or restrictions may be placed on the transfer, based on one or more preset rules. One of ordinary skill in the art would appreciate that there are numerous rules and restrictions that may be utilized, and embodiments of the present invention are contemplated for use with any appropriate rules or restrictions. The exemplary disclosed content may include a media, digital content, an app, a website or a web platform, a social media account of any desired social media, a group chat (e.g., including any desired source, platform or type of chat such as online chat or a chat room), a digital forum (e.g., any desired location or platform on which users such as digital users may communicate), a metaverse space (e.g., a virtual world), a multiverse space, a textual work, a graphical work, a multimedia work, an audio work, a visual work, a digital channel, and/or any other desired content.

According to an embodiment of the present invention, current market value of a stake in a channel is calculated by the system. In at least some exemplary embodiments of the present invention, the system calculates the value of a stake in the channel by taking into account one or more data points, selected from the group comprising, but not limited to, verified views (PoV) of the content, the revenue stream of the channel, the recommendation engine and other key parameters. One of ordinary skill in the art would understand that there are numerous key parameters and other data points that could be utilized in calculating the value of a stake in a channel, and the overall channel value, and embodiments of the present invention are contemplated for use with any such data points and key parameters. In effect the exchange presented by the system will work much like online spot exchanges where buyers can bid/offer and set limits for purchasing or selling stakes that are available on the exchange index. The exemplary disclosed stake may include a stake of a media, a stake of digital content, a stake of an app, a stake of a website, a stake of a web platform, a stake of a social media account, a stake of a group chat, a stake of a digital forum, a stake of a multiverse space, a stake of a metaverse space, a stake of a textual work, a stake of a graphical work, a stake of a multimedia work, a stake of an audio work, a stake of a visual work, a stake of a digital work, a stake of an analog work, a stake of a channel, and/or any other desired stake.

Figure 1:
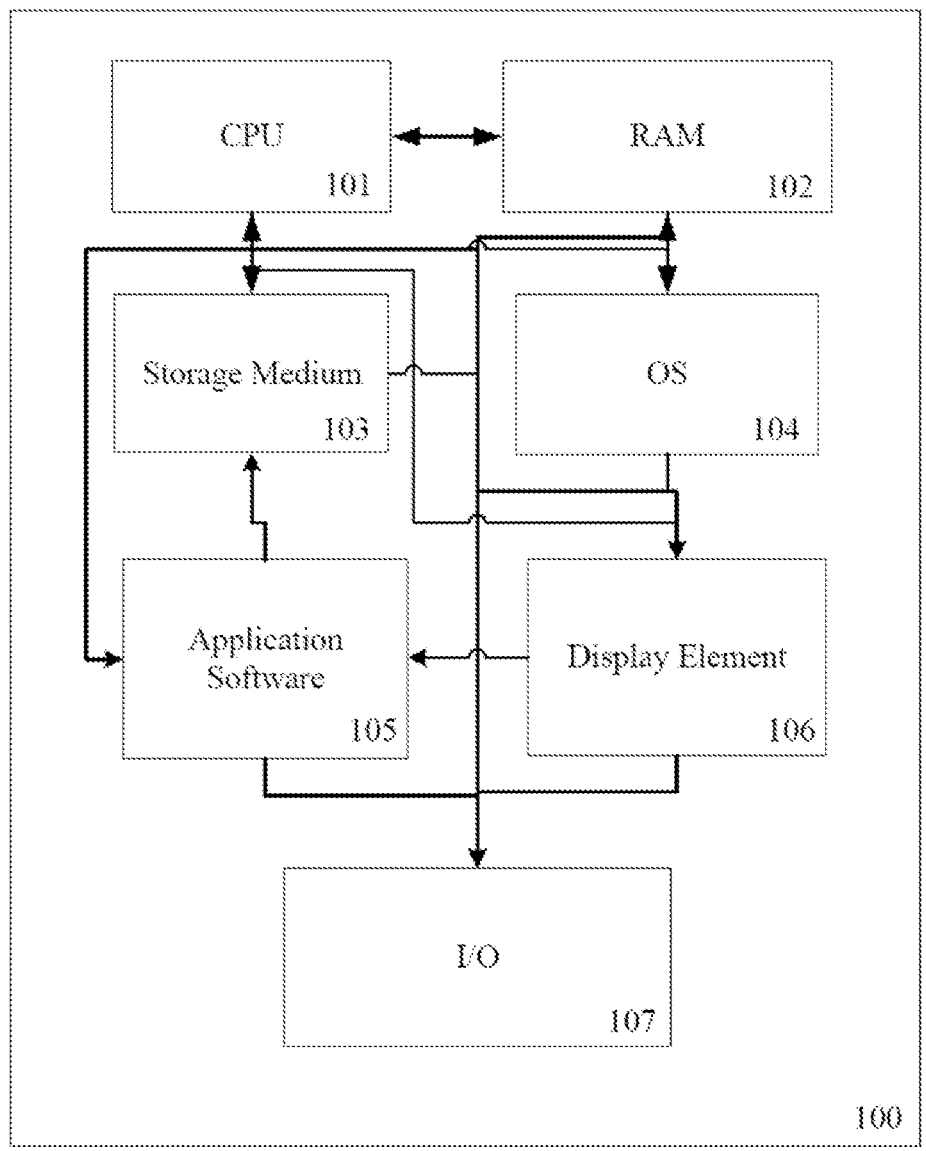
FIG. 1 is a schematic illustration of an exemplary computing device, in accordance with at least some exemplary embodiments of the present invention.

Turning now to FIG. 1, an illustrative representation of a computing device appropriate for use with embodiments of the system of the present disclosure is shown. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element (e.g., monitor, capacitive touchscreen) 106, and one or more input/output devices/means 107, including one or more communication interfaces (e.g., RS232, Ethernet, Wifi, Bluetooth, USB). Useful examples include, but are not limited to, personal computers, servers, tablet PCs, smartphones, or other computing devices. In preferred embodiments of the present invention, multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 2, which is discussed herein-below.

According to an exemplary embodiment of the present disclosure, data may be transferred to the system, stored by the system and/or transferred by the system to users of the system across local area networks (LANs) or wide area networks (WANs). In accordance with the previous embodiment, the system may be comprised of numerous servers, mining hardware, computing devices, or any combination thereof, communicatively connected across one or more LANs and/or WANs. One of ordinary skill in the art would appreciate that there are numerous manners in which the system could be configured and embodiments of the present disclosure are contemplated for use with any configuration.

Figure 2:
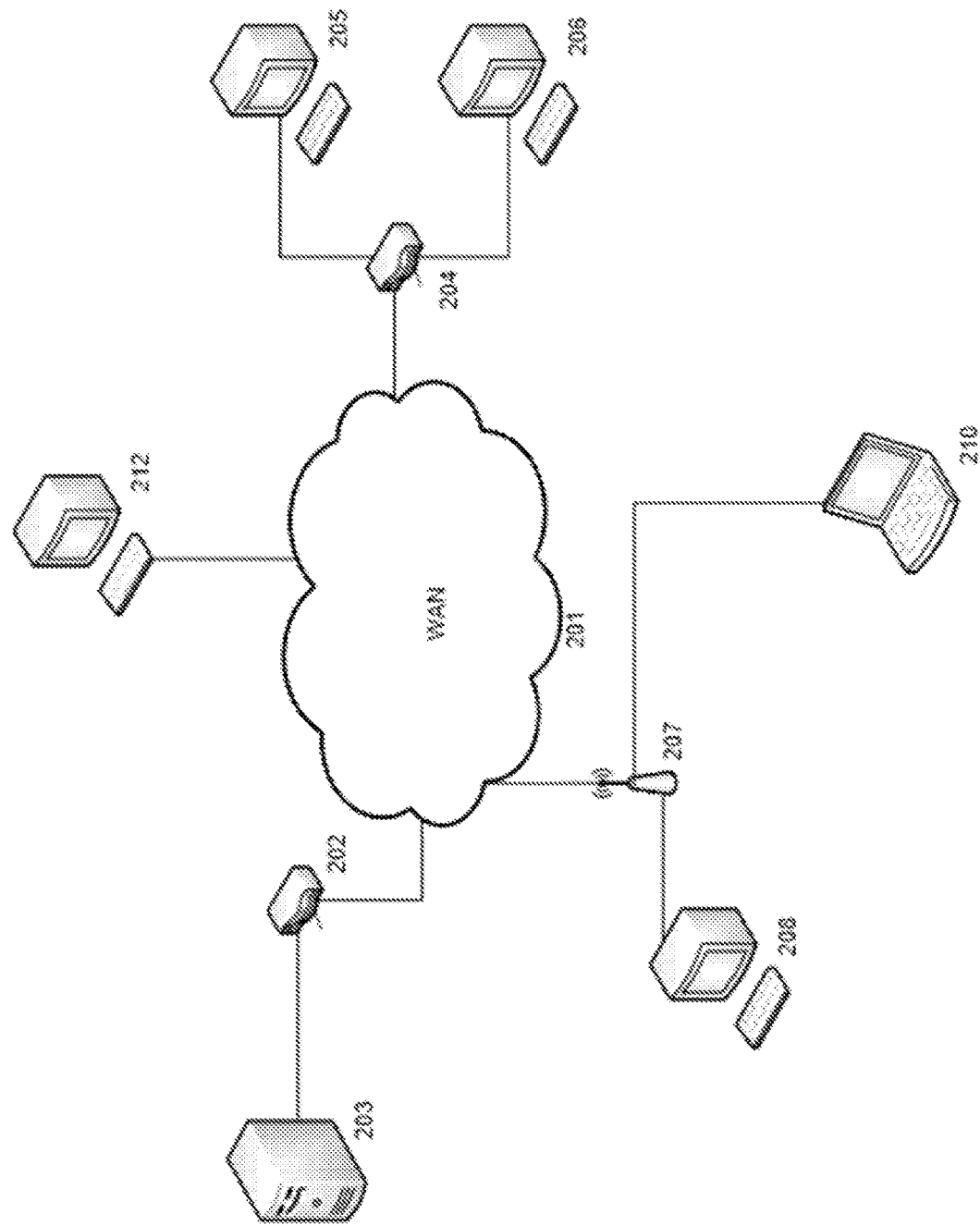
FIG. 2 is a schematic illustration of an exemplary network, in accordance with at least some exemplary embodiments of the present invention.

Referring to FIG. 2, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, or iii) through a computing device 208, 210 connected to a wireless access point 207. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

The exemplary disclosed system and method may be used in any suitable application for providing a Proof of View (PoV) of online content. For example, the exemplary disclosed system and method may be used in any suitable application for ensuring that content such as internet content available on the internet has actually been viewed by a user such as a consumer. The exemplary disclosed system and method may for example be used in any application in which providing PoV (e.g., verifying that a user actually viewed content) affects a valuation or compensation (e.g., based on advertising revenue tied to a number of users viewing content) for a given website or platform.

Figure 4:
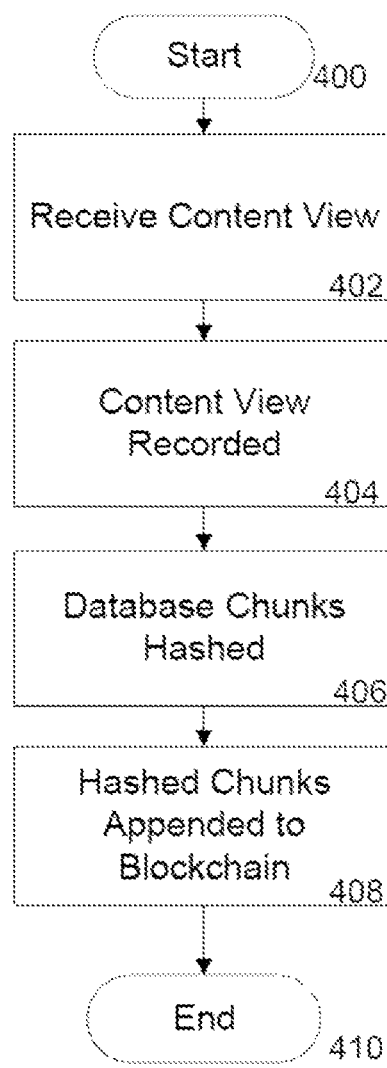
FIG. 4 is an illustration of an exemplary method for providing proof of view via blockchain, in accordance with an embodiment of the present invention.

Turning now to FIG. 4, an exemplary method for providing proof of view via blockchain, in accordance with an embodiment of the present invention, is shown. The process starts at 400 with the system being engaged to provide PoV for one or more pieces of online content. At step 402, the system receives a content view event, generally via a user requesting to view a piece of content. Content may be any form of textual, graphical, multimedia, or other audio/visual or other digital or analog work. One of ordinary skill in the art would appreciate that there are numerous types of content that could be used with embodiments of the present invention, and embodiments of the present invention are contemplated for use with any appropriate type of content. The exemplary disclosed content view may include content viewed using any desired web browser (e.g., Google Chrome, Apple Safari, Microsoft Internet Explorer, Mozilla Firefox, Opera, or any other suitable web browser). The exemplary disclosed content view may also include content viewed using any suitable application programming interface (API) or app such as mobile device apps, web apps, hybrid apps, or any other suitable type of app. The exemplary disclosed content view may further include content viewed on any suitable device such as, for example, smart tv or any other suitable type of streaming device.

At step 404, the content view is recorded by the system and those associated with the system in that the system comprises those mining and recording transactions (e.g., views) on the system's associated blockchain. The view record may be digitally signed by the viewer and/or by the system. In an exemplary embodiment of the present invention, chunks of a database in which the views may be recorded are then hashed (step 406). Any suitable digital signature scheme may be used with exemplary embodiments of the present invention, and exemplary embodiments of the present invention may be used with any appropriate type of digital signature.

At step 408, at the next entrance of a block on the blockchain, each of the hashed database chunks will be appended to a block on the blockchain ledger. At this point, each of the recorded views can be verified at any time as the PoV blockchain is available for review. Since the data is stored in a decentralized manner, any third party is able to prove that each top hash added to the PoV blockchain is accurate and unchanged. This allows any third party to verify that the logs added within each new block on the blockchain have not been tampered with, changed, branched or forked. At this point, the process terminates at step 410.

Figure 5:
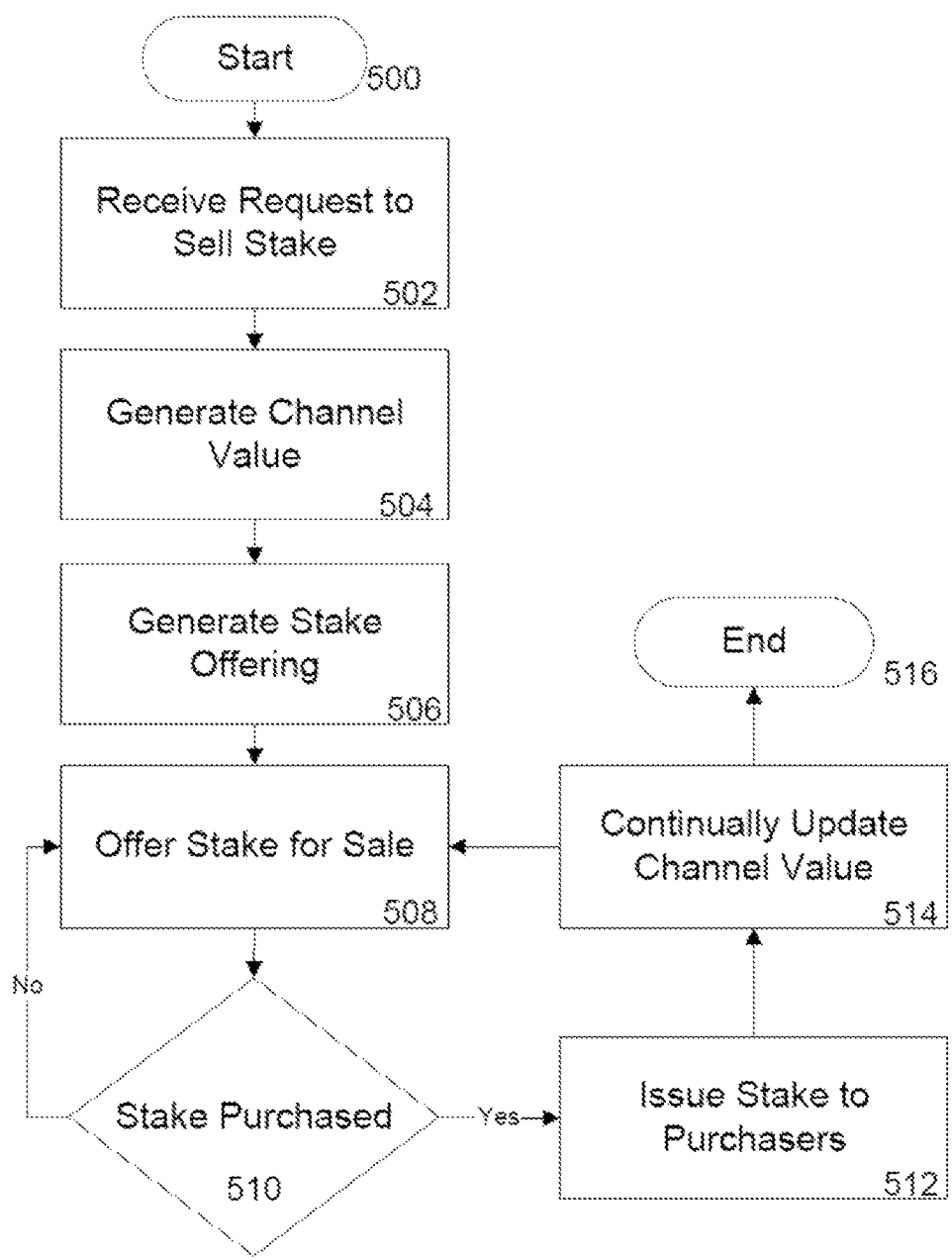
FIG. 5 is an illustration of an exemplary method for providing a channel stake marketplace, leveraging proof of view via blockchain, in accordance with an embodiment of the present invention.

Turning now to FIG. 5, an illustration of an exemplary method for providing a channel stake marketplace, leveraging proof of view via blockchain in accordance with an embodiment of the present invention, is shown. The process starts at step 500 with a user implementing a request to sell stake in a channel. The system receives the request to sell a stake at step 502, and parses the information in the request for use in the generation of a stake offering. Information associated with the request may include, but is not limited to, size of the stake offered (e.g., total $ in currency, cryptocurrency, or other compensation desired from sale, or maximum % of channel to offer).

At step 504, the system generates a value of the channel involved in the stake offering. In at least some exemplary embodiments, the value of the channel may be based on the number of verified content views retrieved from the PoV blockchain associated with the system or the channel. Other data points may also be used to generate this value, including, but not limited to, growth rate of a channel, number of subscribers to a channel, history of channel and stake offerings, or any combination thereof. One of ordinary skill in the art would appreciate that there are numerous data points that could be utilized with embodiments of the present invention for determining the value of a channel, and embodiments of the present invention are contemplated for use with any appropriate data points.

At step 506, the system generates the stake offering, based at least in part on the channel value and/or the information associated with the request. Once generated, the system offers the generated stake offering for sale to users (step 508). The stake offering may be purchased at step 510.

If the stake is not purchased, the system may re-offer the stake for sale. In certain embodiments, before reoffering the stake for sale, the stake offering may be recalculated on one or more points, for instance, by recalculating a sale price of each share in the channel, or by re-assessing the channel value.

If the stake offering is successful and subscribed to, then the system will issue the relevant stakes to those who invested or otherwise purchased a stake in the channel (step 512). Rights and revenues may then be conveyed to the purchasing users as provided for in the stake offering.

At step 514, with the stakes issued to the various purchasers, the system continues to monitor and update the channel value. As long as permissible under the rules of the stake offering, the users that purchased into the stake may offer their portion of the stake for sale to others. Generally, this offering will be at the current value priced by the system. However, in other embodiments, the system may allow for more complex trading means (e.g., offers, options). At this point, the process terminates at step 516.

In at least some exemplary embodiments, the exemplary Proof of View verification system may include a Proof of View verification module, comprising computer-executable code stored in non-volatile memory, and a processor. The Proof of View verification module and the processor may be configured to receive a request for a content view to view a piece of content, record a content view data in a database chunk, hash the database chunk into a hashed database chunk, append the hashed database chunk to a block on a blockchain of the Proof of View verification system, and compare the content view data with the block on the blockchain. The blockchain may be publicly available. The blockchain may be available for review by any third party. Each top hash added to the blockchain may be auditable by any third party. Each new block added to the blockchain may be auditable by any third party. The piece of content may be textual data, graphical data, multimedia data, audio data, and/or visual data. The content view may be an internet webpage view. The Proof of View verification system may include a plurality of parties engaged in mining and recording transactions on the blockchain. The Proof of View verification module and the processor may be configured to provide a unique ID to a user, the unique ID being associated with data on the blockchain corresponding to that user's content view data. The user may use the unique ID to ensure (e.g., compare that the data on the blockchain corresponding to that user's content view data is accurate. The Proof of View verification system may automatically compare the content view data with the block on the blockchain. The Proof of View verification system may automatically provide an alert notice when the content view data does not match the block. The Proof of View verification system may be detached (e.g., substantially completely detached) from any entities or parties. For example, the Proof of View verification system may be a decentralized finance system that may operate without central financial entities. The Proof of View verification system may utilize smart contracts on blockchain similarly to for example the exemplary disclosed blockchains described herein. For example, the Proof of View verification system may utilize decentralized applications that use blockchain such as described herein to perform financial functions. In at least some exemplary embodiments, the Proof of View verification system may utilize smart contracts on blockchains to capture, verify, and validate (e.g., and enforce) agreed-upon contractual terms between multiple parties. The Proof of View verification system may thereby provide agreements and transactions to be performed among entities (e.g., anonymous entities) without use of a central entity or external legal enforcement. For example, the Proof of View verification system may allow for data of a smart contract to be encrypted and to exist on the blockchain (e.g., the data recorded in the blockchain may not be modified, lost, or deleted).

In at least some exemplary embodiments, the exemplary method may include receiving a request to sell a stake of a channel of the channel stake marketplace, determining a value of the channel, generating a stake offering based on the value of the channel, and updating the value of the channel. Determining the value of the channel may include determining the amount of verified content views of the channel. Determining the amount of verified content views of the channel may include recording a content view data in a database chunk, hashing the database chunk into a hashed database chunk, appending the hashed database chunk to a block on a blockchain, and comparing the content view data with the block on the blockchain. The value of the channel may be based on the number of verified content views retrieved from the blockchain. The exemplary method may also include issuing the stake of the channel to a user who purchased the stake of the channel based on the stake offering. The value of the channel may be based on data points such as, for example, growth rate of the channel, number of subscribers to the channel, history of the channel, and/or history of stake offerings. Updating the value of the channel may include determining an updated amount of verified content views of the channel.

In at least some exemplary embodiments, the method may include receiving a request for a content view to view a piece of content, recording a content view data in a database chunk, hashing the database chunk into a hashed database chunk, appending the hashed database chunk to a block on a blockchain, and comparing the content view data with the block on the blockchain. Each new block added to the blockchain may be auditable by any third party. The content view may be an internet webpage view. The exemplary method may further include providing a unique ID to a user, the unique ID being associated with data on the blockchain corresponding to that user's content view data. The user may use the unique ID to ensure (e.g., compare) that the data on the blockchain corresponding to that user's content view data is accurate.

In at least some exemplary embodiments, the exemplary disclosed Proof of View verification system may include a Proof of View verification module, comprising computer-executable code stored in non-volatile memory, a processor, and a plurality of computing devices. The Proof of View verification module, the processor, and the plurality of computing devices may be configured to receive a request to sell a stake of a channel, determine a value of the channel, generate a stake offering based on the value of the channel, and update the value of the channel. Determining the value of the channel may include determining the amount of verified content views of the channel. Determining the amount of verified content views may include transferring data of a piece of content between the plurality of computing devices. Determining the amount of verified content views of the channel may include providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block. The blockchain may be publicly available and accessible via a third party computing device. The Proof of View verification module, the processor, and the plurality of computing devices may also be configured to issue the stake of the channel to a user who purchased the stake of the channel based on the stake offering, and utilize smart contracts on the blockchain. The blockchain may be available for review by any third party. Each top hash added to the blockchain may be auditable by any third party. Each new block added to the blockchain may be auditable by any third party. The data of the piece of content may be selected from the group consisting of textual data, graphical data, multimedia data, audio data, and visual data. The verified content views may be selected from the group of internet webpage views, app views, streaming device views including smart tv views, and combinations thereof. Transferring the data of the piece of content between the plurality of computing devices may include streaming video data between the plurality of computing devices via a local area network or a wide area network. The Proof of View verification system may include a plurality of parties engaged in mining and recording transactions on the blockchain. The Proof of View verification module, the processor, and the plurality of computing devices may be configured to compare the content view data with the unique ID data to ensure that the data on the blockchain corresponding to the user's content view data is accurate. The Proof of View verification system may automatically compare the content view data with the block on the blockchain. The Proof of View verification system may provide an alert notice when the content view data does not include the unique ID data.

In at least some exemplary embodiments, the exemplary disclosed method may include receiving a request to sell a stake of a channel, determining a value of the channel, generating a stake offering based on the value of the channel, and updating the value of the channel. Determining the value of the channel may include determining the amount of verified content views of the channel. Determining the amount of verified content views may include transferring data of a piece of content between a plurality of computing devices. Determining the amount of verified content views of the channel may include providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block. The blockchain may be publicly available and accessible via a third party computing device. The exemplary disclosed method may also include issuing the stake of the channel to a user who purchased the stake of the channel based on the stake offering, and utilizing smart contracts on the blockchain. The value of the channel may be based on the number of verified content views retrieved from the blockchain. The value of the channel may be based on data points selected from the group consisting of growth rate of the channel, number of subscribers to the channel, history of the channel, and history of stake offerings. Updating the value of the channel may include determining an updated amount of verified content views of the channel.

In at least some exemplary embodiments, the exemplary disclosed method may include receiving a request to sell a stake of a channel, determining a value of the channel, generating a stake offering based on the value of the channel, and updating the value of the channel. Determining the value of the channel may include determining the amount of verified content views of the channel. Determining the amount of verified content views may include transferring data of a piece of content between a plurality of computing devices. Determining the amount of verified content views of the channel may include providing a unique ID data for a user, recording a content view data, which corresponds to the transferred data of the piece of content, in a database chunk, hashing the database chunk into a hashed database chunk, appending the hashed database chunk to a block on a blockchain, and comparing the content view data with the block on the blockchain by determining whether or not the unique ID data is included in both the content view data and the block. The exemplary disclosed method may also include issuing the stake of the channel to a user who purchased the stake of the channel based on the stake offering. The blockchain may be publicly available and accessible via a third party computing device. The content view data may be stored on a computing device that blocks public access to the content view data. The value of the channel may be based on the number of verified content views retrieved from the blockchain. The value of the channel may be based on data points selected from the group consisting of growth rate of the channel, number of subscribers to the channel, history of the channel, and history of stake offerings.

Figure 6:
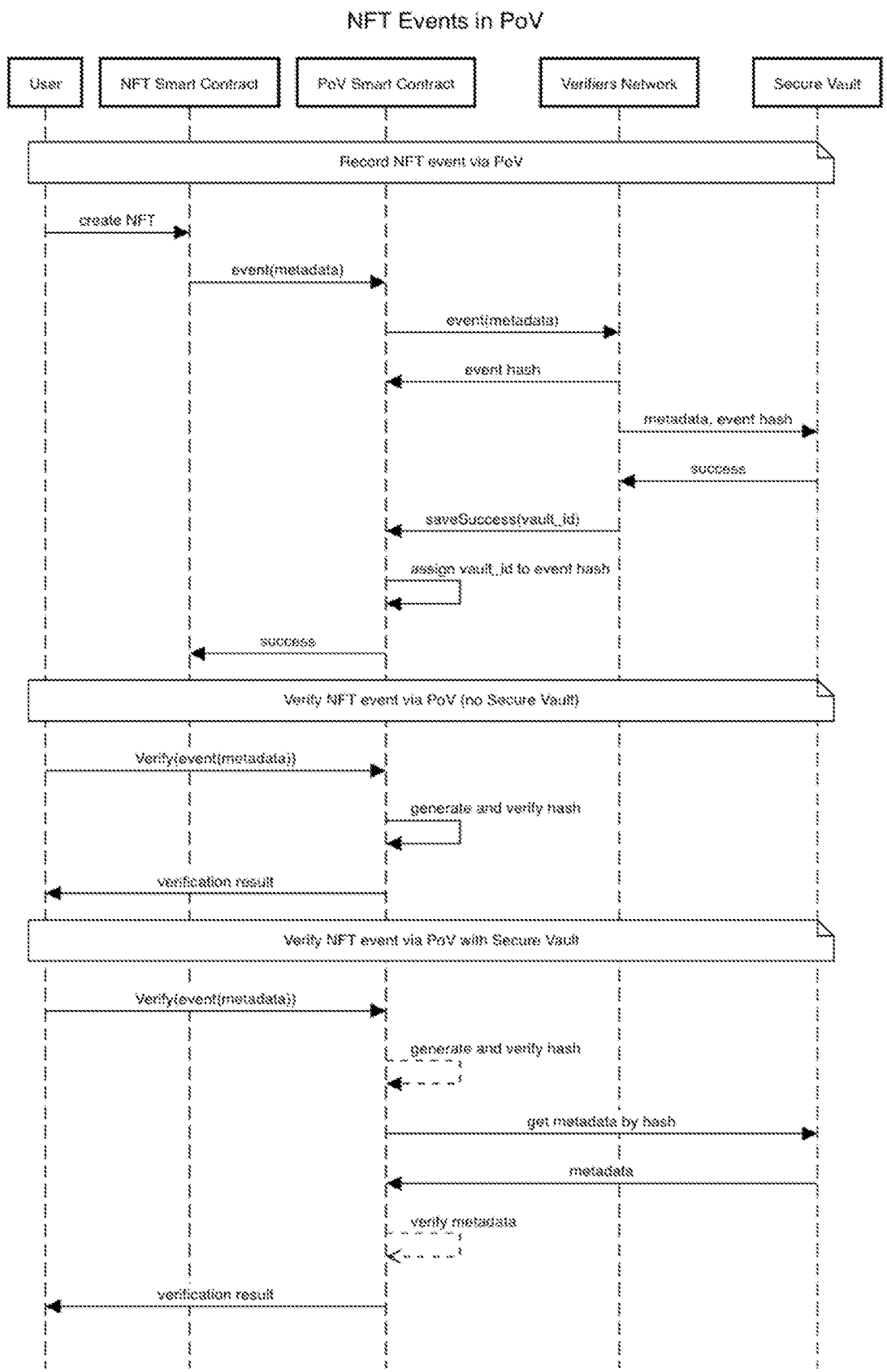
FIG. 6 is a schematic illustration of an exemplary operation of at least some exemplary embodiments of the present invention.

FIG. 6 illustrates another exemplary embodiment of the exemplary disclosed system and method. FIG. 6 illustrates an exemplary process for providing PoV of non-fungible tokens (NFTs). An NFT may be represented by a token, a record, and/or any other suitable type of blockchain item. An NFT may operate in conjunction with (e.g., be manipulated via) a smart contract executed in the blockchain using a smart contract module. As disclosed for example herein, the exemplary disclosed system and method may include an NFT smart contract module and a PoV smart contract module. An NFT may also be implemented via a blockchain network such as a proprietary blockchain network (e.g., the NFT may be an integral part of the blockchain network without involving a smart contract). In at least some exemplary embodiments, an NFT may be used in conjunction with a non-blockchain use case such as a centralized storage. For example, the centralized storage may be operated by a trusted organization or one or more entities (e.g., multiple parties) that may be responsible for integrity and accessibility of some or substantially all NFT content data (e.g., that may be stored in a CDN, database, file server, and/or any other suitable technique for storing data).

The exemplary disclosed NFT may be a unique token that may be recorded in a blockchain and that may include metadata describing content, authorship, ownership, and/or any other suitable data or details of the NFT. For example, NFTs may be included in (e.g., may exist in) a dedicated blockchain (e.g., serving a purpose related to PoV of NFT). Also for example, NFTs may be included in (e.g., may exist in) in any suitable blockchain for supporting smart contracts (e.g., Ethereum) or any other suitable type of executable that may interact with the blockchain. For example, an NFT proxy smart contract may be deployed to Ethereum blockchain. For example, an NFT proxy smart contract may represent a core entry point for interacting with (e.g., dealing with) NFTs on a blockchain. An NFT proxy smart contract may pass any suitable function calls to its subordinary smart contracts (e.g., containing actual scripts for providing functionality). Having a proxy smart contract may allow efficient (e.g., easy) security and feature upgrades for NFTs (e.g., in the future) by maintaining or keeping the original smart contract address the same while changing underlying smart contracts representing NFT logic.

Also for example, DeFi NFTs may operate similarly to as described above for NFT proxy smart contracts, but may not include or involve a centralized smart contract managing the NFTs (e.g., some or all of the NFTs). In at least some exemplary embodiments, decentralized short life cycle smart contracts may be used to manage NFT operation. Also for example in at least some exemplary embodiments, an NFT may be included or exist outside of blockchain using strong cryptography that may protect contents of the NFT.

The exemplary disclosed NFT may include any suitable metadata. For example, the exemplary disclosed NFT may include metadata of a token type and/or a token version. The exemplary disclosed NFT may also include author metadata such as, for example, author name, author address, author contact information, and/or author signature. The exemplary disclosed NFT may include metadata including license information, current owner metadata, content hash metadata, and/or extensions metadata.

The exemplary disclosed NFT may include any suitable type of NFT content. For example, the exemplary disclosed NFT may include one or more data files including image data, audio recording data, video data, program source code, executable script, compiled program executable, digital item, data set, and/or any other suitable data files. The exemplary disclosed NFT content may include one or more events, a chain of events, an independent set of events, and/or any other suitable event. The exemplary disclosed NFT content may also include rank or title information, trophy information, achievement information, web page information, address or other identifier information, information associated with commercial secrets, information regarding know-how, invention or research information, industrial project information, research information, and/or information regarding a physical object. The exemplary disclosed NFT content may include information regarding technical drawings, charts, plans, processes, and/or methods. The exemplary disclosed NFT content may further include information regarding rights such as, for example, right of ownership, admittance permission, right of priority, author rights, and/or any other suitable rights.

The exemplary disclosed NFT may include any suitable type of attribution. The NFT attribution may include an author and/or creator attribution such as digitally-signed, biometrically-signed, virtually-signed, unsigned, and/or any other suitable author and/or creator attribution type. The NFT attribution may include an owner attribution such as exclusive owner, fractional owner, renter, licensee, and/or any other suitable owner attribution type. The NFT attribution may also include a viewer or a user attribution type.

The exemplary disclosed system and method may involve or include any suitable type of NFT action such as, for example, creating an NFT, transferring or selling (e.g., assigning) an NFT, editing or modifying an NFT, renting an NFT, leasing an NFT, viewing an NFT, revealing hidden NFT content, locking an NFT, and/or destroying or invalidating an NFT.

The exemplary disclosed system and method may include any suitable features, processes, and/or characteristics relating to NFT life cycle. For example, the exemplary disclosed system and method may include any suitable features, processes, and/or characteristics relating to creating NFTs. An author or delegated creator may mint NFTs for desired content (e.g., particular content) by using any suitable technique. For example, the exemplary disclosed system and method may use open source programs or applications (e.g., a minting app) or an online minting resource (e.g., minting website) that may be dedicated to the purpose of minting NFTs. Also for example, an NFT may be minted based on direct interaction (e.g., a user directly interacting with) an NFT smart contract on a blockchain. In at least some exemplary embodiments (e.g., in a use case) in which a blockchain (e.g., a dedicated blockchain) is used for operating NFTs, minting may be provided (e.g., may be held) based on direct interaction with the blockchain (e.g., based on a user interacting with the blockchain directly) and/or via a minting program or application such as a minting app or a minting website. In at least some exemplary embodiments, before minting commences, a creator of the NFT may provide metadata and/or content of an NFT. The NFT metadata and/or content may then be processed by any suitable technique such as a program or application (e.g., minting app), a minting website, a smart contract, and/or a blockchain.

In at least some exemplary embodiments, as a result of an NFT creation operation, a new token may be recorded in a blockchain and stored under a desired (e.g., particular) blockchain address (e.g., wallet) having attached metadata including information provided during the creation process. For example, the metadata may include a unique NFT content hash that may be used to identify the NFT content. Also for example, NFT content may be transferred (e.g., data sent) to a data storage (e.g., secure data storage such as a secure vault) for example as illustrated in FIG. 6 (e.g., to confirm or ensure its existence according to terms of the secure vault). NFT creation (e.g., successful NFT creation) may be recorded to a PoV network (e.g., similar to the exemplary disclosed PoV system described herein, which may operate with the exemplary disclosed NFT system and method as a PoV of NFT system), and may be used for future reference and verification.

The exemplary disclosed NFTs may be immutable (e.g., immutable by design). For example, changes (e.g., any changes) made to the NFT's metadata may trigger issuing the NFT's copy with changed metadata and/or burning the original NFT. These changes may be recorded via PoV (e.g., similar to the exemplary disclosed PoV system described herein, which may operate with the exemplary disclosed NFT system and method as a PoV of NFT system) for future reference and verifiability.

The exemplary disclosed system and method may include any suitable features, processes, and/or characteristics related to selling NFTs. A sale (e.g., NFT ownership sale) may be held between a current owner of an NFT and a buyer of the NFT. Ownership of an NFT may also be sold, assigned, licensed, or otherwise transferred using third party entities or platforms such as auctions, escrow services, and/or any suitable marketplace. Current ownership of an NFT may be verified by checking one or more corresponding records in a PoV network (e.g., similar to the exemplary disclosed PoV system described herein, which may operate with the exemplary disclosed NFT system and method as a PoV of NFT system) by use of verification software, a verification website, and/or any other suitable technique. In at least some exemplary embodiments, a buyer may pay a price for the NFT and the seller may send an NFT token to the buyer's wallet or transfer payment via any other suitable technique. The new owner or a third party assisting in the sale may update the owner metadata of the NFT being exchanged via a selling API, via directly interacting with the NFT smart contract, and/or via any other suitable technique. A successful sale may be recorded via the PoV system (e.g., similar to the exemplary disclosed PoV system described herein, which may operate with the exemplary disclosed NFT system and method as a PoV of NFT system) for future reference and verifiability. In at least some exemplary embodiments, the transfer may be an automatic sale via smart contract method, an automatic sale via a third party service, or a manual sale via smart contract methods.

The exemplary disclosed system and method may include any suitable features, processes, and/or characteristics relating to editing metadata of an NFT. For example, an author of the NFT content and/or the current owner of the NFT may update metadata of the NFT. An author may update authoring information using the author's signature used during NFT creation. In at least some exemplary embodiments, if the token was created unsigned, an owner (e.g., any owner) of the NFT may alter author metadata. Also for example, a current owner or owners may update metadata regarding ownership of the NFT. Further for example, a current owner or owners may update extended metadata of the NFT token.

The exemplary disclosed system and method may include any suitable features, processes, and/or characteristics relating to viewing content of an NFT. For example, in the case of open content, NFT metadata may contain an http link and a hash of the content data. Any party or entity (e.g., anyone) may read the link and view and/or download the content. The content may for example be validated using a content hash record from the NFT metadata.

Also for example, in the case of secure vault open content, the metadata of the NFT may contain both content hash and a secure vault link. Any party or entity (e.g., anyone) may read the link and view and/or download the content. The content may be validated using a content hash record from the NFT metadata. Availability of the content may be provided for (e.g., guaranteed) by one or more secure vaults.

Further for example, in the case of secure vault closed content, the metadata of the NFT may contain both content hash and a secure vault link. The owner of the NFT token (e.g., and no other party or entity) may be able to decode encrypted NFT content using for example a private key. Decoded content may be validated using a content hash record from the NFT metadata. Availability of the content may be provided for (e.g., guaranteed) by one or more secure vaults. Additionally for example, the exemplary disclosed system and method may utilize mixed content including both open and encrypted parts.

The exemplary disclosed system and method may include any suitable features, processes, and/or characteristics relating to locking NFTs. Entities such as trusted authorities may lock or unlock NFTs (e.g., certain NFTs) during investigation if fraudulent activity is suspected. For example, an NFT may be locked if an author claims that his or her original work was copied and another NFT including the author's work has been created. For example, the exemplary disclosed system and method may provide for review of related facts and PoV records so that the entity such as the trusted authority may identify the original NFT (e.g., for example based on the exemplary processes disclosed herein) and lock one or more fraudulent NFTs to prevent usage of the one or more fraudulent NFTs. The exemplary disclosed system and method may also provide an unlock functionality that may be utilized in cases or situations in which the NFT has been locked by mistake, investigation has shown or proven the suspect NFT is legal or legitimate, and/or any other suitable case or situation.

The exemplary disclosed system and method may include any suitable features, processes, and/or characteristics relating to destroying and/or invalidating NFTs. An owner of an NFT (e.g., any exclusive owner of the NFT) may destroy the NFT by burning the token (e.g., the actual token). Destruction of the NFT may also be recorded via PoV (e.g., similar to the exemplary disclosed PoV system described herein, which may operate with the exemplary disclosed NFT system and method as a PoV of NFT system) to confirm or ensure that further copies (e.g., any possible further copies) of the NFT may be identified (e.g., easily identified) as fakes.

In at least some exemplary embodiments and for example as illustrated in FIG. 6, the exemplary disclosed system and method may include a secure vault. The exemplary disclosed PoV network may store and maintain (e.g., keep) records of hashed NFT content and NFT interactions using any suitable technique (e.g., in form of Merkle tree). The exemplary disclosed system and method may utilize (e.g., assign) secure vaults to store the actual content of the NFTs. One or more secure vaults may be assigned for each content hash record. Also for example, some content records may not have a secure vault assigned to them. Any desired number of secure vaults may be connected to the exemplary disclosed PoV network. Each secure vault may have its own storage terms. A secure vault may be (e.g., or may include) a blockchain that may be capable of storing data or may be or may include any suitable data storage such as file servers, databases, cloud storages, and/or any other suitable storage. Each secure vault may accept one or more types of NFT content. The secure vault may be accredited for NFT content storage. NFT content may or may not utilize encryption when stored. In at least some exemplary embodiments, the secure vault may be associated with benefits from participating in NFT content storage for example by receiving rewards from stored NFT sales, charging a fee (e.g., one-time or recurring price or fee) for storage, charging an annual fee for storage, receiving storage for free, and/or any other suitable benefits.

FIG. 6 illustrates an exemplary operation of the exemplary disclosed PoV of NFT system and method. For example as disclosed above, the exemplary disclosed PoV system may provide PoV of NFT by operating with the exemplary disclosed NFT system. As illustrated in FIG. 6 and for example as described herein, the exemplary disclosed system and method may provide for creating NFTs, recording an NFT event via PoV, providing an event hash, and assigning a secure vault to a secure vault. As illustrated in FIG. 6, the exemplary disclosed system and method may verify an NFT event via PoV without a secure vault or with a secure vault.

In at least some exemplary embodiments, creating NFTs may include converting existing NFTs into PoV-enabled NFTs. The exemplary disclosed system and method may include any suitable software module for communicating with a desired blockchain network to access, send, and receive NFTs such as, for example, a wallet (e.g., a warp wallet). The exemplary disclosed warp wallet may be included in the exemplary disclosed Non-Fungible Token smart contract module, the exemplary disclosed Proof of View smart contract module, the exemplary disclosed verifier network, and/or a stand-alone wallet module of the exemplary disclosed system and method.

For example, any suitable blockchain (e.g., that operates with the exemplary disclosed system and method) operating NFTs of other (e.g., third party) standards and/or specifications may include software (e.g., wallets) that may be automated by NFT converter software and/or Warp Smart Contracts that operate individually and that may be monitored by NFT converter software of the exemplary disclosed system and method. For example, the NFT converter software may be included in the exemplary disclosed warp wallet of the exemplary disclosed system and method. For example, the exemplary disclosed NFT converter software may be part of the exemplary disclosed verifier network or may exist as a separate module (e.g., a stand-alone module or solution).

An owner of an existing NFT (e.g., an external or foreign NFT) may send the existing NFT to the exemplary disclosed Warp Wallet or Warp Smart Contract of the exemplary disclosed system and method, and may provide data of a valid receiving wallet address to the exemplary disclosed Warp Wallet or Warp Smart Contract of the exemplary disclosed system and method. In doing so, the owner of the existing NFT may convert the existing NFT to a Proof of View enabled NFT (POV-enabled NFT).

When such an incoming existing NFT is detected by the exemplary disclosed system and method in the exemplary disclosed warp wallet or warp smart contract, and data of a valid receiving wallet address is present, the exemplary disclosed converter software may store some or substantially all of the data from the existing NFT (e.g., original foreign NFT), and may initiate creation of a copy of the new NFT (e.g., PoV-enabled NFT) in the Proof Of View enabled environment. The exemplary disclosed system and method may also burn, delete, or invalidate the existing NFT (e.g., the original NFT) to ensure that no duplicates of the NFT are made (e.g., no duplicates are possible). Data (e.g., a record) for the NFT that has been converted into the PoV-enabled NFT (e.g., as a new NFT) may be added to the exemplary disclosed verifier network. Also, a verification hash may be recorded to the PoV by the exemplary disclosed system and method.

In at least some exemplary embodiments, the exemplary disclosed converter software may operate multiple wallets and smart contracts across a plurality of blockchains (e.g., different blockchains) simultaneously. The exemplary disclosed system and method may thereby provide NFT conversion to PoV-enabled NFTs and also transition of NFTs between blockchains or any other suitable NFT-enabled media.

The exemplary disclosed Proof of View verification system may include a Non-Fungible Token smart contract module, comprising computer-executable code stored in non-volatile memory, a Proof of View smart contract module, comprising computer-executable code stored in non-volatile memory, a processor, and a verifier network. The Non-Fungible Token smart contract module, the Proof of View smart contract module, the processor, and the verifier network may be configured to transfer a data of a non-fungible token to the Non-Fungible Token smart contract module and generate an event metadata based on the data of the non-fungible token, transfer the event metadata to the Proof of View smart contract module, and generate an event hash using the verifier network and transferring the event hash from the verifier network to the Proof of View smart contract module. Generating the event hash may include generating a hashed database chunk and appending the hashed database chunk to a block on a blockchain. The exemplary disclosed system may also include a secure data storage. The Non-Fungible Token smart contract module, the Proof of View smart contract module, the processor, the verifier network, and the secure data storage may be configured to transfer the event metadata and the event hash to the secure data storage and store the event metadata and the event hash in the secure data storage. The Non-Fungible Token smart contract module, the Proof of View smart contract module, the processor, the verifier network, and the secure data storage may be configured to retrieve a metadata using the event hash stored in the secure data storage. The Non-Fungible Token smart contract module, the Proof of View smart contract module, the processor, the verifier network, and the secure data storage may be configured to assign a storage identification data to the event hash stored in the secure data storage. The Non-Fungible Token smart contract module, the Proof of View smart contract module, the processor, and the verifier network may be configured to verify a proposed event metadata by using the Proof of View smart contract module and the verifier network to compare the proposed event metadata to the event metadata. The Non-Fungible Token smart contract module, the Proof of View smart contract module, the processor, and the verifier network may be configured to transfer a verification result data to a user based on comparing the proposed event metadata to the event metadata. The proposed event metadata may be data of ownership of the non-fungible token. The data of the non-fungible token may be non-fungible token creation data that may be recorded to the Proof of View smart contract module as the event hash. The data of the non-fungible token may be data of changes to the metadata of the non-fungible token that may be recorded to the Proof of View smart contract module as the event hash. The data of the non-fungible token may be data of a sale or a destruction of the non-fungible token that is recorded to the Proof of View smart contract module as the event hash.

The exemplary disclosed method may include providing a Non-Fungible Token smart contract module, comprising computer-executable code stored in non-volatile memory, providing a Proof of View smart contract module, comprising computer-executable code stored in non-volatile memory, providing a verifier network, transferring a data of a non-fungible token to the Non-Fungible Token smart contract module and generating an event metadata based on the data of the non-fungible token, transferring the event metadata to the Proof of View smart contract module, and generating an event hash using the verifier network and transferring the event hash from the verifier network to the Proof of View smart contract module. Generating the event hash may include generating a hashed database chunk and appending the hashed database chunk to a block on a blockchain. The exemplary disclosed method may also include transferring the event metadata and the event hash to a secure data storage and storing the event metadata and the event hash in the secure data storage. The exemplary disclosed method may further include retrieving a metadata using the event hash stored in the secure data storage. The exemplary disclosed method may also include assigning a storage identification data to the event hash stored in the secure data storage. The exemplary disclosed method may further include verifying a proposed event metadata by using the Proof of View smart contract module and the verifier network to compare the proposed event metadata to the event metadata. The exemplary disclosed method may also include transferring a verification result data to a user based on comparing the proposed event metadata to the event metadata.

The exemplary disclosed Proof of View verification system may include a Non-Fungible Token smart contract module, comprising computer-executable code stored in non-volatile memory, a Proof of View smart contract module, comprising computer-executable code stored in non-volatile memory, a processor, a verifier network, and a secure data storage. The Non-Fungible Token smart contract module, the Proof of View smart contract module, the processor, the verifier network, and the secure data storage may be configured to transfer a data of a non-fungible token to the Non-Fungible Token smart contract module and generate an event metadata based on the data of the non-fungible token, transfer the event metadata to the Proof of View smart contract module, generate an event hash using the verifier network and transfer the event hash from the verifier network to the Proof of View smart contract module, transfer the event metadata and the event hash to the secure data storage and store the event metadata and the event hash in the secure data storage, and assign a storage identification data to the event hash stored in the secure data storage. Generating the event hash may include generating a hashed database chunk and appending the hashed database chunk to a block on a blockchain. The Non-Fungible Token smart contract module, the Proof of View smart contract module, the processor, the verifier network, and the secure data storage may be configured to retrieve a metadata using the event hash stored in the secure data storage. The Non-Fungible Token smart contract module, the Proof of View smart contract module, the processor, the verifier network, and the secure data storage may be configured to verify a proposed event metadata by using the Proof of View smart contract module and the verifier network to compare the proposed event metadata to the event metadata.

The exemplary disclosed content stake offering system may include a content stake offering module, comprising computer-executable code stored in non volatile memory, a processor, and a plurality of computing devices. The content stake offering module, the processor, and the plurality of computing devices are configured to receive a request to sell a stake of content; determine a value of the content; generate a stake offering based on the value of the content; update the value of the content; wherein determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain; wherein the blockchain is publicly available and accessible via a third party computing device; issue the stake of the content to a user who purchased the stake of the content based on the stake offering; utilize smart contracts on the blockchain; and record data points of the content on the blockchain; wherein the plurality of computing devices utilize the smart contracts on the blockchain, including verifying agreed-upon contractual terms between multiple parties. The stake of the content may be at least one selected from the group of a stake of a media, a stake of digital content, a stake of an app, a stake of a website, a stake of a web platform, a stake of a social media account, a stake of a group chat, a stake of a digital forum, a stake of a multiverse space, a stake of a metaverse space, a stake of a textual work, a stake of a graphical work, a stake of a multimedia work, a stake of an audio work, a stake of a visual work, a stake of a digital work, a stake of an analog work, a stake of a channel, and combinations thereof. The content stake offering system may include providing a unique user ID data; and comparing a content view data of the content with the block on the blockchain by determining whether or not the unique user ID data is included in both the content view data and the block. The plurality of computing devices verify content views utilizing the smart contracts. The content stake offering module, the processor, and the plurality of computing devices may be configured to compare the content view data with the unique user ID data to ensure that the data on the blockchain corresponding to the user's content view data is accurate. The content stake offering system may automatically compare the content view data with the block on the blockchain. The content stake offering system may provide an alert notice when the content view data does not include the unique user ID data. The blockchain may be available for review by any third party. Each top hash added to the blockchain may be auditable by any third party. Each new block added to the blockchain may be auditable by any third party. Verifying the agreed-upon contractual terms between multiple parties may include providing agreements and transactions that are performed among anonymous entities without use of a central entity or external legal enforcement. The content may be selected from the group of internet webpages, apps, streaming media including smart tv media, and combinations thereof. Transferring the data of the piece of content between the plurality of computing devices may include streaming video data between the plurality of computing devices via a local area network or a wide area network. Utilizing the smart contracts on the blockchain may include capturing and validating agreed-upon contractual terms between the multiple parties.

The exemplary disclosed method may be performed by a content stake offering module, a processor, and a plurality of computing devices, and may include receiving a request to sell a stake of content; determining a value of the content; generating a stake offering based on the value of the content; updating the value of the content; wherein determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain; wherein the blockchain is publicly available and accessible via a third party computing device; issuing the stake of the content to a user who purchased the stake of the content based on the stake offering; utilizing smart contracts on the blockchain; and recording data points of the content on the blockchain; wherein the plurality of computing devices utilize the smart contracts on the blockchain, including verifying agreed-upon contractual terms between multiple parties. The value of the content may be based on data selected from the group including growth rate of the content, number of subscribers to the content, history of the content, and history of content offerings. The data points may be stored on a computing device that blocks public access to the data points. The stake of the content may be at least one selected from the group of a stake of a media, a stake of digital content, a stake of an app, a stake of a website, a stake of a web platform, a stake of a social media account, a stake of a group chat, a stake of a digital forum, a stake of a multiverse space, a stake of a metaverse space, a stake of a textual work, a stake of a graphical work, a stake of a multimedia work, a stake of an audio work, a stake of a visual work, a stake of a digital work, a stake of an analog work, a stake of a channel, and combinations thereof.

The exemplary disclosed content stake offering system may include a content stake offering module, comprising computer-executable code stored in non volatile memory, a processor, and a plurality of computing devices. The content stake offering module, the processor, and the plurality of computing devices may be configured to receive a request to sell a stake of content; determine a value of the content; generate a stake offering based on the value of the content; update the value of the content; wherein determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain; wherein the blockchain is publicly available and accessible via a third party computing device; issue the stake of the content to a user who purchased the stake of the content based on the stake offering; utilize smart contracts on the blockchain; and record data points of the content on the blockchain; and provide a unique user ID data; wherein the plurality of computing devices utilize the smart contracts on the blockchain, including verifying agreed-upon contractual terms between multiple parties. The content may be at least one selected from the group of a media, digital content, an app, a website or a web platform, a social media account, a group chat, a digital forum, a multiverse space, a metaverse space, a textual work, a graphical work, a multimedia work, an audio work, a visual work, a digital channel, and combinations thereof. The content stake offering system may further include comparing a content view data of the content with the block on the blockchain by determining whether or not the unique user ID data is included in both the content view data and the block. The plurality of computing devices may verify content views utilizing the smart contracts.

The exemplary disclosed system and method may provide an efficient technique for verifying views of content such as internet content that may be viewed by internet users. For example, the exemplary disclosed system and method may provide a transparent technique for users to utilize a public ledger to verify that online content has actually been viewed. The exemplary disclosed system and method may thereby provide an effective technique for determining the value of a content provider's channel (e.g., for the purposes of compensation based on advertising or other criteria dependent on how much given content is viewed by users such as consumers). For example, the exemplary disclosed system and method may verify whether an intended targeted audience has actually viewed content of a given provider (e.g., as well as advertisements that may be co-located with the content). Further, the exemplary disclosed system and method may provide an efficient technique for providing attribution, content, and viewing of NFTs.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. A content stake offering system, comprising:
   a content stake offering module, comprising computer-executable code stored in non volatile memory;
   a processor; and
   a plurality of computing devices;
   wherein the content stake offering module, the processor, and the plurality of computing devices are configured to:
   receive a request to sell a stake of content;

determine a value of the content;

generate a stake offering based on the value of the content;

update the value of the content;

wherein determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain;

wherein the blockchain is publicly available and accessible via a third party computing device;

issue the stake of the content to a user who purchased the stake of the content based on the stake offering;

utilize smart contracts on the blockchain; and record data points of the content on the blockchain;

wherein the plurality of computing devices utilize the smart contracts on the blockchain, including verifying agreed-upon contractual terms between multiple parties.

2. The content stake offering system of claim 1, wherein the stake of the content is at least one selected from the group of a stake of a media, a stake of digital content, a stake of an app, a stake of a website, a stake of a web platform, a stake of a social media account, a stake of a group chat, a stake of a digital forum, a stake of a multiverse space, a stake of a metaverse space, a stake of a textual work, a stake of a graphical work, a stake of a multimedia work, a stake of an audio work, a stake of a visual work, a stake of a digital work, a stake of an analog work, a stake of a channel, and combinations thereof.

3. The content stake offering system of claim 1, further comprising:

providing a unique user ID data; and comparing a content view data of the content with the block on the blockchain by determining whether or not the unique user ID data is included in both the content view data and the block.

4. The content stake offering system of claim 3, wherein the plurality of computing devices verify content views utilizing the smart contracts.

5. The content stake offering system of claim 3, wherein the content stake offering module, the processor, and the plurality of computing devices are configured to compare the content view data with the unique user ID data to ensure that the data on the blockchain corresponding to the user's content view data is accurate.

6. The content stake offering system of claim 3, wherein the content stake offering system automatically compares the content view data with the block on the blockchain.

7. The content stake offering system of claim 3, wherein the content stake offering system provides an alert notice when the content view data does not include the unique user ID data.

8. The content stake offering system of claim 1, wherein the blockchain is available for review by any third party.

9. The content stake offering system of claim 1, wherein each top hash added to the blockchain is auditable by any third party.

10. The content stake offering system of claim 1, wherein each new block added to the blockchain is auditable by any third party.

11. The content stake offering system of claim 1, wherein verifying the agreed-upon contractual terms between multiple parties includes providing agreements and transactions that are performed among anonymous entities without use of a central entity or external legal enforcement.

12. The content stake offering system of claim 1, wherein the content is selected from the group of internet webpages, apps, streaming media including smart tv media, and combinations thereof.

13. The content stake offering system of claim 1, wherein transferring the data of the piece of content between the plurality of computing devices includes streaming video data between the plurality of computing devices via a local area network or a wide area network.

14. The content stake offering system of claim 1, wherein utilizing the smart contracts on the blockchain includes capturing and validating agreed-upon contractual terms between the multiple parties.

15. A method performed by a content stake offering module, a processor, and a plurality of computing devices, comprising:

receiving a request to sell a stake of content;

determining a value of the content;

generating a stake offering based on the value of the content;

updating the value of the content;

wherein determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain;

wherein the blockchain is publicly available and accessible via a third party computing device;

issuing the stake of the content to a user who purchased the stake of the content based on the stake offering;

utilizing smart contracts on the blockchain; and recording data points of the content on the blockchain;

wherein the plurality of computing devices utilize the smart contracts on the blockchain, including verifying agreed-upon contractual terms between multiple parties.

16. The method of claim 15, wherein the value of the content is based on data selected from the group including growth rate of the content, number of subscribers to the content, history of the content, and history of content offerings.

17. The method of claim 15, wherein the data points are stored on a computing device that blocks public access to the data points.

18. The method of claim 15, wherein the stake of the content is at least one selected from the group of a stake of a media, a stake of digital content, a stake of an app, a stake of a website, a stake of a web platform, a stake of a social media account, a stake of a group chat, a stake of a digital forum, a stake of a multiverse space, a stake of a metaverse space, a stake of a textual work, a stake of a graphical work, a stake of a multimedia work, a stake of an audio work, a stake of a visual work, a stake of a digital work, a stake of an analog work, a stake of a channel, and combinations thereof.

19. A content stake offering system, comprising:

a content stake offering module, comprising computer-executable code stored in non volatile memory;

a processor; and a plurality of computing devices;

wherein the content stake offering module, the processor, and the plurality of computing devices are configured to:

receive a request to sell a stake of content;
determine a value of the content;
generate a stake offering based on the value of the content;
update the value of the content;
wherein determining the value of the content includes transferring data of a piece of content between the plurality of computing devices, recording a content data, which corresponds to the transferred data of the piece of content, in a database chunk, hashing the database chunk into a hashed database chunk, and appending the hashed database chunk to a block on a blockchain;
wherein the blockchain is publicly available and accessible via a third party computing device;
issue the stake of the content to a user who purchased the stake of the content based on the stake offering;
utilize smart contracts on the blockchain; and
record data points of the content on the blockchain; and
provide a unique user ID data;
wherein the plurality of computing devices utilize the smart contracts on the blockchain, including verifying agreed-upon contractual terms between multiple parties.

20. The content stake offering system of claim 19, wherein the content is at least one selected from the group of a media, digital content, an app, a website or a web platform, a social media account, a group chat, a digital forum, a multiverse space, a metaverse space, a textual work, a graphical work, a multimedia work, an audio work, a visual work, a digital channel, and combinations thereof.

21. The content stake offering system of claim 19, further comprising comparing a content view data of the content with the block on the blockchain by determining whether or not the unique user ID data is included in both the content view data and the block.

22. The content stake offering system of claim 21, wherein the plurality of computing devices verify content views utilizing the smart contracts.

* * * * *